United States Patent
Matsui

(10) Patent No.: US 10,659,638 B2
(45) Date of Patent: May 19, 2020

(54) IMAGE RECORDING APPARATUS WITH A SHEET-EJECTION CONTROLLABLE MECHANISM

(71) Applicant: BROTHER KOGYO KABUSHIKI KAISHA, Nagoya, Aichi (JP)

(72) Inventor: Yuki Matsui, Kiyosu (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/676,383

(22) Filed: Aug. 14, 2017

(65) Prior Publication Data

US 2017/0346972 A1 Nov. 30, 2017

Related U.S. Application Data

(63) Continuation of application No. 15/086,470, filed on Mar. 31, 2016, now Pat. No. 9,736,325.

(30) Foreign Application Priority Data

Mar. 31, 2015 (JP) .................................. 2015-074292
Mar. 31, 2015 (JP) .................................. 2015-074293

(51) Int. Cl.
  *H04N 1/00* (2006.01)
  *G06K 15/16* (2006.01)
  *B41J 13/00* (2006.01)

(52) U.S. Cl.
  CPC ...... *H04N 1/00633* (2013.01); *B41J 13/0009* (2013.01); *G06K 15/16* (2013.01)

(58) Field of Classification Search
  None
  See application file for complete search history.

(56) References Cited

U.S. PATENT DOCUMENTS

2004/0216628 A1* 11/2004 Nordlund ............. B41J 13/0018
                                                                 101/231
2007/0025745 A1    2/2007 Aoki
(Continued)

FOREIGN PATENT DOCUMENTS

JP     HEI 4-363299 A     12/1992
JP     H05-057972 A        3/1993
(Continued)

OTHER PUBLICATIONS

United States Notice of Allowance dated Apr. 4, 2017 received in related U.S. Appl. No. 15/086,470.
(Continued)

*Primary Examiner* — Thomas D Lee
(74) *Attorney, Agent, or Firm* — Scully, Scott, Murphy & Presser, P.C.

(57) ABSTRACT

An image recording apparatus, including a body including a path to convey a sheet from a feeder tray to an ejection tray; a conveyer unit to convey the sheet; a recording unit to record an image on the sheet; and a controller to control the conveyer unit and the recording unit, is provided. The controller is configured to execute a ejection request accepting process, in which the controller accepts a request for executing a sheet ejection job being a single job to eject the sheet without causing a recording action in the recording unit; and a sheet ejecting process, in which, after accepting the request for executing the sheet ejection job, the controller controls the conveyer unit to convey the sheet from the feeder tray to the ejection tray without causing the recording action in the recording unit.

14 Claims, 11 Drawing Sheets

(56) References Cited

U.S. PATENT DOCUMENTS

| | | |
|---|---|---|
| 2007/0180159 A1 | 8/2007 | Takahashi |
| 2014/0013156 A1 | 1/2014 | Cho |
| 2015/0036156 A1* | 2/2015 | Kondo ............... G06K 15/4065 358/1.12 |

FOREIGN PATENT DOCUMENTS

| | | | |
|---|---|---|---|
| JP | HEI 5-313446 A | | 11/1993 |
| JP | 06156803 A | * | 6/1994 |
| JP | H06-156803 A | | 6/1994 |
| JP | HEI 11-129602 A | | 5/1999 |
| JP | 2000-238365 A | | 9/2000 |
| JP | 2006-162855 A | | 6/2006 |
| JP | 2006-321593 A | | 11/2006 |
| JP | 2007-055814 A | | 3/2007 |
| JP | 2010-064383 A | | 3/2010 |
| JP | 2015-47756 A | | 3/2015 |

OTHER PUBLICATIONS

United States Office Action dated Oct. 5, 2016 received in related U.S. Appl. No. 15/086,470.
Japanese Decision of Rejection dated Oct. 2, 2018 received in Japanese Patent Application No. 2015-074292, together with an English-language translation.
Notification of Reasons for Rejection dated Jul. 10, 2018 in Japanese Patent Application No. 2015-074292.
Notification of Reasons for Rejection dated Jul. 17, 2018 in Japanese Patent Application No. 2015-074293.

* cited by examiner

IMAGE RECORDING APPARATUS WITH A SHEET-EJECTION CONTROLLABLE MECHANISM

CROSS REFERENCE TO RELATED APPLICATION

This application is a continuation application of U.S. application Ser. No. 15/086,470 filed on Mar. 31, 2016, which claims benefit of Japanese Patent Applications No. 2015-074292 and No. 2015-074293, both filed on Mar. 31, 2015, the entire subject matters of which are incorporated herein by reference.

BACKGROUND

Technical Field

An aspect of the present disclosure relates to an image recording apparatus capable of recording an image on a recordable medium.

Related Art

An image recording apparatus may have a feeder tray to store and support recordable sheets, a feeder roller to pick up the recordable sheets from the feeder tray, a recording unit to record images on the recordable sheets, a conveyer roller to convey the recordable sheets to the recording unit, an ejection tray to catch the recordable sheets conveyed through the recording unit, and a controller to control the feeder roller, the recording unit, and the conveyer roller. An image recording apparatus may have multiple feeder trays, rather than a single feeder tray, to store and support different sizes and/or types of recordable sheets separately and multiple feeder rollers to pick up the recordable sheets from the multiple feeder trays. The controller may accept a request from a user, when, for example, the user presses a key in an operation unit disposed on a body of the image recording apparatus, and may manipulate the feeder roller(s), the recording unit, and the conveyer roller to record images on the recordable sheets and eject the recordable sheets on the ejection tray. The request from the user to the image recording apparatus may be input through, for example, an external apparatus which is connected with the image recording apparatus through wired or wireless communication.

SUMMARY

Meanwhile, the user of the image recording apparatus may wish to use a blank recordable sheet in the feeder tray as, for example, a note sheet for drawing and/or writing. In such a case, the user may pull the feeder tray out of the body of the image recording apparatus and take out the recordable sheet from the feeder tray. Further, the user may be required to place the feeder tray back in the body. If the image recording apparatus has the multiple feeder trays for different types of recordable sheets, the user may determine the desired feeder tray among the multiple feeder trays that may contain the desired type of recordable sheets, pull the desired feeder tray out of the body, take out the recordable sheet, and place the feeder tray back in the body. The series of actions may be bothersome.

The present disclosure is advantageous in that an image recording apparatus, which may deliver a user's desired sheet promptly from the feeder tray, is provided. Further, an image recording apparatus, which may deliver the user's desired sheet promptly among a plurality of types of sheets from one of a plurality of feeder trays, is provided.

According to an aspect of the present disclosure, an image recording apparatus, including a body including a path, along which a sheet is conveyed from a feeder tray to an ejection tray; a conveyer unit configured to convey the sheet along the path; a recording unit configured to record an image on the sheet being conveyed; and a controller configured to control the conveyer unit and the recording unit, is provided. The controller is configured to execute an ejection request accepting process, in which the controller accepts a request for executing a sheet ejection job, the sheet ejection job being a single job to eject the sheet from the feeder tray at the ejection tray without causing a recording action to record an image on the sheet in the recording unit; and a sheet ejecting process, in which, after accepting the request for executing the sheet ejection job, the controller controls the conveyer unit to convey the sheet from the feeder tray to the ejection tray without causing the recording action in the recording unit.

According to another aspect of the present disclosure, an image recording apparatus, including a body including a path, along which a sheet is conveyed from a feeder tray to an ejection tray; a conveyer unit configured to convey the sheet along the path; a recording unit configured to record an image on the sheet being conveyed; and a controller configured to control of the conveyer unit and the recording unit, is provided. The body includes an operation unit, through which an operation from a user to input a request for executing a sheet ejection job to the controller is accepted by a single action from the user, the sheet ejection job being a single job to eject the sheet from the feeder tray at the ejection tray without causing a recording action to record an image on the sheet in the recording unit.

According to another aspect of the present disclosure, an image recording apparatus, including a body including a path, along which a sheet is conveyed from one of a plurality of feeder trays to an ejection tray, the plurality of feeder trays being configured to support different-typed sheets respectively, the different-typed sheets including a first sheet; a conveyer unit configured to convey the sheet along the path; a recording unit configured to record an image on the sheet being conveyed; a memory device configured to store sheet-type information for each of the plurality of feeder trays, the sheet-type information being information regarding a type of the sheet supported on the feeder tray; and a controller configured to control the conveyer unit and the memory device, is provided. The controller is configured to execute, when the controller receives a request for executing a sheet ejection job from a user, the sheet ejection job being a single job to eject the first sheet from one of the plurality of feeder trays at the ejection tray: a tray-selecting process, in which the controller selects the one of the plurality of feeder trays to support the first sheet based on the sheet-type information; and a sheet ejecting process, in which the controller controls the conveyer unit to convey the first sheet supported on the one of the plurality of feeder trays selected in the tray-selecting process without recording the image on the sheet in the recording unit.

BRIEF DESCRIPTION OF THE ACCOMPANYING DRAWINGS

DETAILED DESCRIPTION

Hereinafter, an image recording apparatus according to embodiments of the present disclosure will be described with reference to the accompanying drawings. It is noted that various connections are set forth between elements in the following description. These connections in general, and unless specified otherwise, may be direct or indirect, and this specification is not intended to be limiting in this respect. Aspects of the present disclosure may be implemented on circuits, such as application specific integrated circuits (ASICs), or in computer software as programs storable on computer-readable media including, but not limited to, RAMs, ROMs, flash memories, EEPROMs, CD-media, DVD-media, temporary storage, hard disk drives, floppy drives, permanent storage, and the like.

In the following description, identical parts or items among the embodiments may be referred to by a same reference sign, and repetitive explanation of those will be omitted. While the accompanying drawings may illustrate aspects of a configuration of the image recording apparatus including elements that are necessary in the present disclosure, some of parts and items that may not be related to the description of the present invention may be omitted.

First Embodiment

[Overall Configuration of the Image Recording Apparatus]

Figure 1:
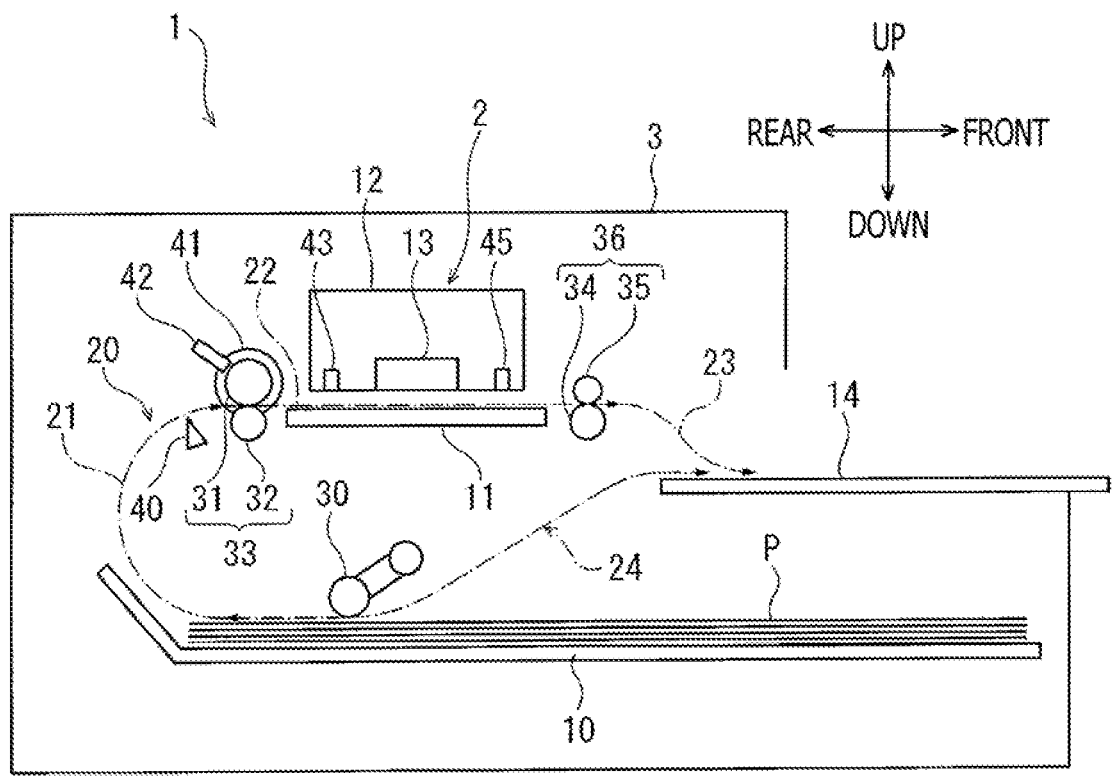
FIG. 1 illustrates an overall configuration of an image recording apparatus according to a first embodiment of the present disclosure.

In the present embodiment, directions concerning the image recording apparatus 1 and each part or component included in the image recording apparatus 1 may be mentioned based on orientations indicated by arrows shown in FIG. 1. For example, a viewer's right-hand side and left-hand side in FIG. 1 are defined as a front side and a rear side, respectively. An upper side and a lower side in FIG. 1 correspond to an upper side and a lower side of the image recording apparatus 1 respectively. A right-to-left or left-to-right direction of the image recording apparatus 1 may also be referred to as a right-left direction or a widthwise direction. An up-to-down or down-to-up direction may also be referred to as a vertical direction. A front-to-rear or rear-to-front direction may be referred to as a front-rear direction or a direction of depth. A conveying direction may refer to a direction to convey a recordable sheet P in the image recording apparatus 1. The recordable sheet P may also be referred to as a sheet P. An upstream side and a downstream side may be referred to with respect to a flow in the conveying direction.

[Image Recording Apparatus]

As shown in FIG. 1, the image recording apparatus 1 includes a body 3, a feeder tray 10 to support the sheet P therein, a recording unit 2 disposed in an upper position with respect to the feeder tray 10 to record an image on the sheet P, and a controller 60 (see FIG. 3) to control each unit in the image recording apparatus 1 including the recording unit 2. The recording unit 2 includes a platen 11, which is a substantially flat plate elongated along the widthwise direction, and a carriage 12, on which a recording head 13 to discharge ink at the platen 11 or the sheet P is mounted. The carriage 12 is arranged in an upper position with respect to the platen 11. In a downstream position from the platen 11 with regard to the conveying direction, arranged is an ejection tray 14 to catch the sheet P, on which an image is recorded by the recording unit 2, as the sheet P is ejected out of the body 3.

A path 20, along which the sheet P is conveyed from the feeder tray 10 to the ejection tray 14, is formed in the body 3. The path 20 includes a curved path 21, a straight path 22, and a latter path 23. The curved path 21 extends from the feeder tray 10 to curve upward and frontward and ends at a rearward position of the platen 11. The straight path 22 starts from the end of the curved path 22 to extend linearly above the platen 11 frontward and ends at a frontward position of the platen 11. The latter path 23 starts from the end of the straight path 22 to extend to the ejection tray 14. In this path 20, the sheet P is conveyed to travel from the feeder tray 10 to the ejection tray 14 through a position between the recording unit 2 and the platen 11.

The image recording apparatus 1 includes a feeder roller 30, a first conveyer unit 33 and a second conveyer unit 36 to convey the sheet P along the path 20. The feeder roller 30 is disposed at an upper position with respect to the feeder tray 10 and feeds the sheet P in the feeder tray 10 to the path 20 and to the first conveyer unit 33. The first conveyer unit 33 is arranged in proximity to a downstream end of the curved path 21 and includes a conveyer roller 31 and a pinch roller 32. The pinch roller 32 and the conveyer roller 31 pinch the sheet P conveyed by the feeder roller 30 from lower and upper sides to convey the sheet P downstream. The second conveyer unit 36 is arranged in proximity to a downstream end of the straight path 22 and includes an ejection roller 34 and a spur roller 35. The spur roller 35 and the ejection roller 34 pinch the sheet P conveyed through the straight path 22 by the first conveyer unit 33 from lower and upper sides to convey the sheet P downstream.

The image recording apparatus 1 includes a plurality of types of sensors, including a registration sensor 40, a rotary encoder sensor 42, a medium sensor 43, and a linear encoder sensor 45. The registration sensor 40 is arranged in the path 20 at a preceding (upstream) position from the first conveyer unit 30. With the registration sensor 40, a central processing unit (CPU) 61 (see FIG. 3) in the controller 60 may detect a leading end and a trailing end of the sheet P being conveyed in the path 20. The registration sensor 40 may include an optical sensor. On one end of a rotation shaft of the conveyer roller 31, disposed is a rotary encoder 41, and the rotary encoder sensor 42 is arranged in proximity to the rotary encoder 41. With the rotary encoder sensor 42, the CPU 61 may detect a rotation amount and a rotation speed of the conveyer roller 31. The conveyer roller 31 and the rotary encoder 41 are arranged coaxially. The medium sensor 43 is for detecting a recordable medium, e.g., the sheet P, and is arranged on a lower surface on a front side of the carriage 12. With the medium sensor 43, the CPU 61 may detect a width and widthwise positions of the sheet P being conveyed in the path 20. The width of the sheet P refers to a dimension of the sheet P along the widthwise direction, which is orthogonal to the conveying direction and orthogonal to a plane of FIG. 1. The widthwise positions of the sheet P may refer to leftward and rightward positions of the sheet P. The medium sensor 43 may include an optical sensor. The linear encoder sensor 45 is for a linear encoder (not shown) and is arranged on the lower surface on a rear side of the carriage 12, in proximity to the linear encoder, which may be an encoder strip. With the linear encoder sensor 45, the CPU 61 may detect a scanning direction, a position, and a moving speed of the carriage 12. The linear encoder sensor 45 may include an optical sensor.

Figure 2:
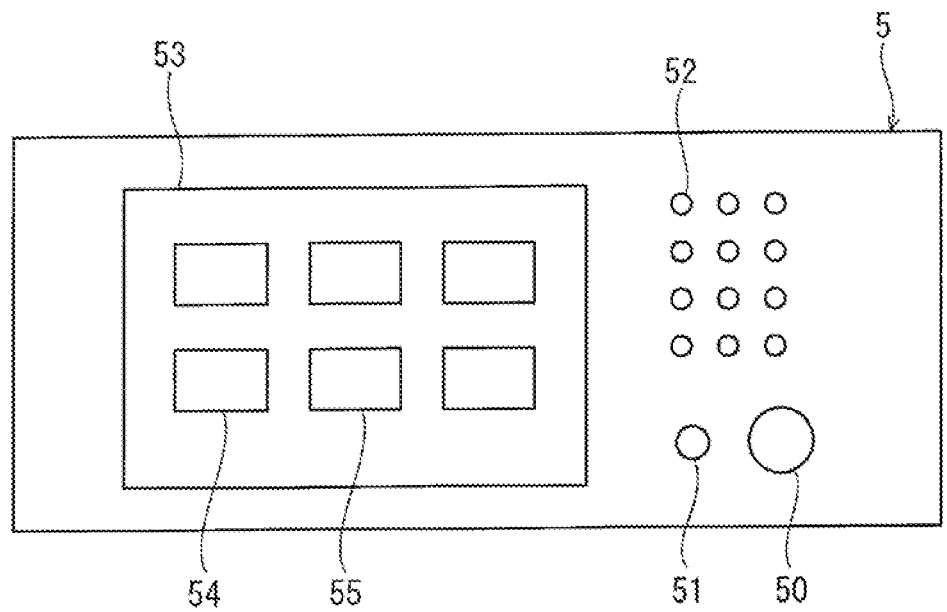
FIG. 2 is an illustrative plan view of an operation unit in the image recording apparatus according to the first embodiment of the present disclosure.

The image recording apparatus 1 includes an operation unit 5 (see FIG. 2). The operation unit 5 is arranged on an upper surface of the body 3 at a position accessible to a user. The operation unit 5 includes a power key 50, a reset key 51, numerical keys 52, and a panel unit 53, which includes a touch-sensitive panel. The panel unit 53 includes a user interface unit, through which the user's requests to the image recording apparatus 1 to execute programs may be entered, and a display unit, through which information regarding the image recording apparatus 1 may be displayed to the user. The panel unit 53 further includes a plurality of keys including a print key 54 and a sheet ejection key 55 in the user interface unit. The print key 54 may be pressed by the user to input a request to execute a print job. The sheet ejection key 55 may be pressed by the user to input a request to execute a sheet ejection job. The sheet ejection job is a single job to convey one of the sheets P stored in the feeder tray 10 and eject at the ejection tray 14 independently from the print job, without causing a recording action to record an image on the sheet P in the recording unit 2, so that the user may, for example, use the ejected sheet P as a blank sheet to draw or write notes. Thus, the image recording apparatus 1 may perform the sheet ejection job independently to eject the sheet P by the user pressing the sheet ejection key 55. The image recording apparatus 1 may include an external input unit (not shown), through which an external job from an external communication device (not shown) such as a personal computer (PC) may be input in the image recording apparatus 1 through wired or wireless communication.

Figure 3:
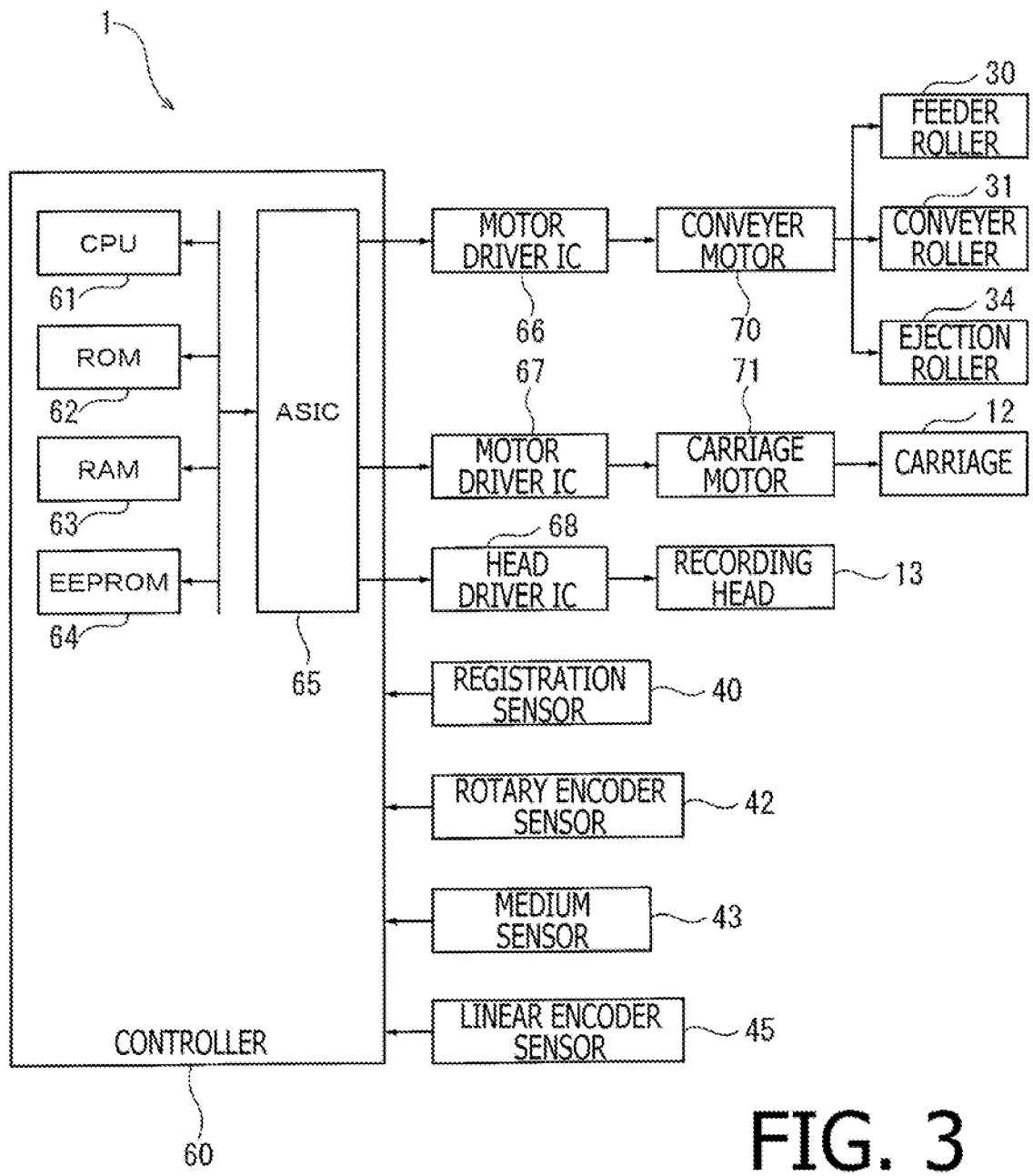
FIG. 3 is a block diagram to illustrate an electrical configuration of the image recording apparatus according to the first embodiment of the present disclosure.

An electric configuration of the image recording apparatus 1 will be described with reference to FIG. 3. The controller 60 includes a first board and a second board. On the first board, the CPU 61, a memory unit including a read-only memory (ROM) 62, a random-access memory (RAM) 63, and electrically erasable programmable ROM (EEPROM) 64 are mounted. On the second board, an application-specific integrated circuit (ASIC) 65 is mounted. The controller 60 may include one or more CPUs 61. The ROM 62 may store a plurality of controlling programs including a print controlling program, which is run in order to implement the print job, and an ejection controlling program, which is run in order to implement the sheet ejection job. The EEPROM 64 may store various types of initial settings and information, which may be input by the user. The ASIC 65 is connected with motor driver integrated circuits (ICs) 66, 67, and a head driver IC 68.

The CPU 61 may accept the request from the user for the print job through the print key 54 or the external input unit. When the print job is entered, the CPU 61 outputs a command to execute the print job to the ASIC 65 based on the print controlling program stored in the ROM 62. Meanwhile, the CPU 61 may accept the request from the user for the sheet ejection job through the sheet ejection key 55 or the external input unit. When the sheet ejection job is entered, the CPU 61 outputs a command to execute the sheet ejection job to the ASCI 65 based on the ejection controlling program stored in the ROM 62. The ASIC 65 receiving the commands may activate driver programs according to the commands. Thus, the print job and the sheet ejection job may be implemented by the controller 60.

The motor driver IC 66 may activate a conveyer motor 70 to generate driving force and may switch transmission paths for the driving force through known a driving system to transmit the driving force selectively to one or more of the feeder roller 30, the conveyer roller 31, and the ejection roller 34. The image recording apparatus 1 may be equipped with a roller driving mechanism, which includes the CPU 61, the motor driver IC, and the driving system. The roller driving system may apply rotation force of the conveyer motor 70 to the feeder roller 30 and the conveyer roller 31 at variable speeds to drive the feeder roller 30 to rotate in a normal direction while the conveyer roller 31 rotates in a reverse direction, and thereafter drive the conveyer roller 31 to rotate in the normal direction while the transmission path to the feeder roller 30 is switched off.

In this regard, the normal direction of the feeder roller 30 and the conveyer roller 31 is rotating direction to convey the sheet P downstream along the conveying direction, e.g., from the feeder tray 10 to the ejection tray 14, and the reverse direction is a rotating direction opposite from the normal direction. The roller driving system may be replaced with, for example, a plurality of conveyer motors 70, and the motor driver IC 66 may activate each conveyer motor 70 to drive the feeder roller 30, the conveyer roller 31, and the ejection roller 34 separately.

The motor driver IC 67 may activate a carriage motor 71 to move the carriage 12 to reciprocate along the main scanning direction. The head driver IC 68 may drive the recording head 13 and manipulate the recording head 13 to discharge ink through the nozzles.

Thus, the behaviors of the feeder roller 30, the conveyer roller 31, and the ejection roller 34 may be conducted by the CPU 61 driving the conveyer motor 70 through the motor driver IC 66. The behavior of the carriage 12 may be conducted by the CPU 61 driving the carriage motor 71 through the motor driver IC. The behavior of the recording head 13 may be conducted by the CPU 61 driving the head driver IC 68.

The controller 60 may receive signals output from the registration sensor 40, the rotary encoder sensor 42, the medium sensor 43, and the linear encoder sensor 45. Based on the received signals, the CPU 61 may control the driver ICs 66-68 to conduct the print job and the sheet ejection job at predetermined timings.

[Behaviors of the Image Reading Apparatus in the Print Job]

The print job may be started in the image recording apparatus 1 when, for example, the user presses the print key 54. More specifically, when the user presses the print key 54, the CPU 61 detects the request for the print job and manipulates the feeder roller 30 to rotate in the normal direction based on the print controlling program to convey the sheet P from the feeder tray 10 to the path 20. When the leading end of the sheet P being conveyed in the curved path 21 reaches the conveyer roller 31, the CPU 61 corrects inclination of the sheet P with respect to the conveying direction to align at the conveyer roller 31. The CPU 61 further drives the conveyer roller 31 to convey the sheet P through the straight path 22 and manipulates the recording head 13 to discharge ink at the sheet P to record an image on the sheet P. The CPU 61 thereafter drives the second conveyer unit 36 to convey the sheet P with the image recorded thereon through the latter path 23 and eject the sheet P at the ejection tray 14. The CPU 61 ends the print job thereat.

When the image recording apparatus 1 is connected with a PC though wired or wireless communication, the CPU 61 may manipulate the PC to display a user interface (UI) screen, through which a user of the PC may input an option regarding the print job, and which may be similar to a user interface screen to be displayed through the operation unit 5, on a display unit of the PC. The user of the PC may input the request for the print job by, for example, clicking a print button displayed on the UI screen. The CPU 61 may then detect the request for the print job.

[Behaviors of the Image Reading Apparatus in the Sheet Ejection Job]

Figure 4:
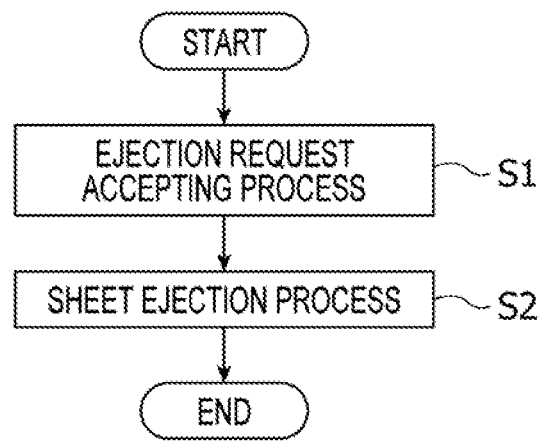
FIG. 4 is a flowchart to illustrate a sheet ejection job to be executed by a controller of the image recording apparatus according to the first embodiment of the present disclosure.

An overall flow of the behaviors of the image reading apparatus 1 in order to implement the sheet ejection job will be described with reference to FIG. 4. According to the flow, the CPU 61 in S1 performs an ejection request accepting process, in which the CPU 61 accepts the request for the print job from the user, and in S2 a sheet ejecting process, in which the CPU 61 conveys the sheet P from the feeder tray 10 to the ejection tray 14 without causing a recording action to record an image on the sheet P in the recording unit 2.

Thus, in S1, the image recording apparatus 1 accepts in the ejection request accepting process in S1 the request for the sheet ejection job through the user's pressing on the sheet ejection key 55 or clicking on the similar button on the UI screen. In the sheet ejecting process in S2, the CPU 61 activates the motor driver IC 66 to convey the sheet P supported on the feeder tray 10 through the path 20 to the ejection tray 14. While the CPU 61 conveys the sheet P in the path 20, no recording action is caused, and no image is recorded by the recording unit 2 on the sheet P. According to this flow, the image recording apparatus 1 may eject and provide the sheet P promptly as a blank sheet to the user.

In the present embodiment, while the sheet ejection job refers to an independent job to convey the sheet P from the feeder tray 10 to eject at the ejection tray 14 without causing a recording action in the recording unit 2, the recording action refers to a behavior of the recording unit 2 to record an image, including text and characters, on the sheet P based on image data. Therefore, when a job is conducted without causing a recording action in the recording unit 2, there may be a case, in which no image data to activate the recording unit 2 is supplied to the image recording apparatus 1, and another case, in which image data containing no substantial information to record an image is supplied to the image recording apparatus 1 so that the recording unit 2 is substantially inactivated.

Figure 5:
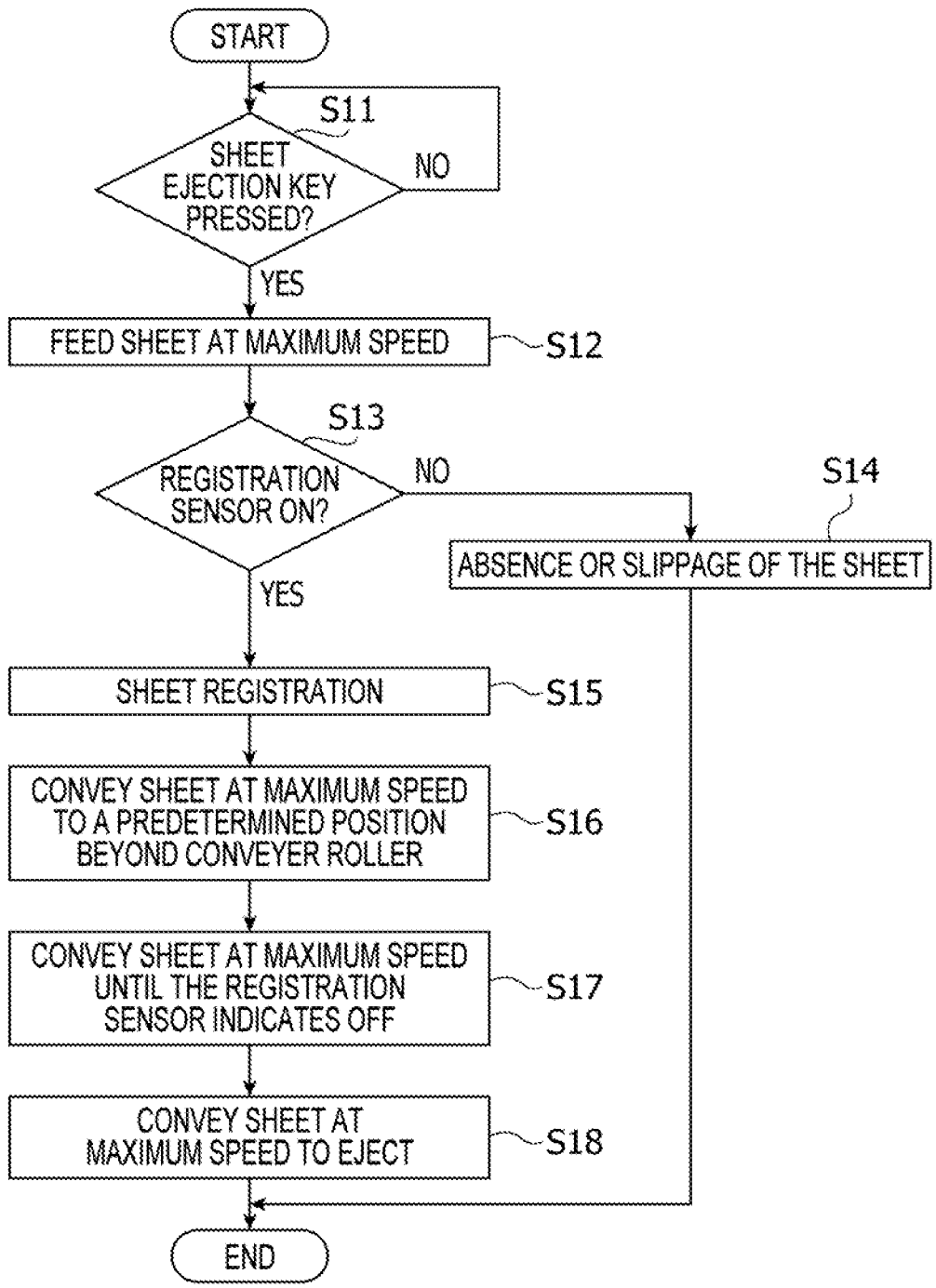
FIG. 5 is a flowchart to illustrate the sheet ejection job to be executed by the controller of the image recording apparatus according to the first embodiment of the present disclosure.

Detailed behaviors of the image recording apparatus 1 in order to implement the sheet ejection job will be described with reference to FIG. 5.

Once the power key 50 is pressed, and the image recording apparatus 1 is powered on, in S11, the CPU 11 executes the ejection request accepting process, in which the CPU 11 determines whether the sheet ejection key 55 in the operation unit 5 or the similar button on the UI screen of the external device is pressed, or the CPU 11 may determine whether any request for a job is entered through the external input unit.

In S11, if the CPU 61 determines that the one of the sheet ejection key 55 in the operation unit 5 and the similar button on the UI screen is pressed, or the CPU 61 determines that a request for a job is entered (S11: YES), in S12, the CPU 61 drives the feeder roller 30 to rotate in the normal direction to feed the sheet P from the feeder tray 10 to the path 20. In S12, the CPU 61 controls a rotation speed of the feeder roller 30 to be faster than a conveying speed to convey the sheet P during a print job. For example, the CPU 61 may control the feeder roller 30 to rotate at a maximum speed, which may be a fastest speed for the feeder roller 30 to convey the sheet P correctly through the path 20.

In S13, the CPU 61 determines whether a signal output from the registration sensor 40 indicates ON. If the signal output from the registration sensor 40 does not indicate ON (S13: NO), in S14, the CPU 61 determines that the feeder tray 10 contains no sheet P or that the sheet P is slipping in the feeder tray 10 or in the curved path 21 and cannot reach the registration sensor 40. The CPU 61 ends the sheet ejecting process thereat. Optionally, following S14, the CPU 61 may control the display unit 53 to display a message to inform the user of the absence of the sheet P in the feeder tray 10 or the slippage of the sheet P before ending the sheet ejecting process.

In S13, if the CPU 61 determines that the signal output from the registration sensor 40 indicates ON (S13: YES), in S15, the CPU 61 registers the sheet P and corrects orientation of the sheet P with respect to the conveying direction, by driving the conveyer roller 31 to rotate in the reverse direction while the feeder roller 30 is driven to rotate in the normal direction for a predetermined amount. In S16, the CPU 61 drives the conveyer roller 31 to rotate in the normal direction at a maximum speed to convey the leading end of the sheet P at a predetermined position at a substantially downstream position from the conveyer roller 31. Optionally, S15 and S16 may be omitted.

In S17, the CPU 61 drives the conveyer roller 31 to rotate in the normal direction at the maximum speed until a signal output from the registration sensor 40 indicates OFF. When the CPU 61 detects the signal output from the registration sensor 40 indicating OFF, in S18, the controller drives the conveyer roller 31 and the ejection roller 34 at the maximum speed to eject the sheet P. The CPU 61 ends the sheet ejecting process thereat. The maximum speed of the conveyer roller 31 and the ejection roller 34 in S17 and S18 is a fastest speed for the conveyer roller 31 to convey the sheet P correctly through the path 20. Meanwhile, in each of S16-S18, the sheet P may not necessarily be conveyed at the maximum speed but may be conveyed at a speed which is faster than or equal to a conveying speed for the rollers at each corresponding step during a print job.

According to the image recording apparatus 1 in the first embodiment, with the user's single action to press the sheet ejection key 55 through the operation unit 5 or the similar key on the UI screen, the CPU 61 may activate the sheet ejection job to eject a blank sheet P from the feeder tray 10 at the ejection tray 14 without recording an image thereon in the recording unit 2, so that the user may obtain the sheet P without taking weary actions to draw the feeder tray 10 out of the body 3, take out the sheet P from the feeder tray 10, and push the feeder tray 10 back in the body 3. Thus, the image recording apparatus 1 may deliver the blank sheet P to the user according to the user's request without bothering the user with the weary actions. In the sheet ejection job, while no image is recorded on the sheet P, a process to exchange image data among an input device, an output device, and/or an external device may be omitted. Therefore, the sheet P may be conveyed from the feeder tray 10 to the ejection tray 14 without activating the recording unit 2 or the external input unit to be delivered to the user promptly. In other words, the behavior suitable to the request from the user, who may desire to have the sheet P promptly, may be performed.

In the image recording apparatus 1 according to the first embodiment, the path 20 is not only used for the sheet P to be conveyed through during a print job but also used for the sheet P to be conveyed through during the sheet ejection job. In other words, the blank sheet P may be ejected to be delivered to the user through the path 20, which is commonly usable with the image recording and sheet ejection. Therefore, compared to a configuration, in which a path for sheet ejection is formed separately from the path for image recording, the configuration of the image recording apparatus 1 may be less complicated and downsized.

The image recording apparatus 1 according to the first embodiment has the operation unit 5 on the body 3 so that the user may operate the image recording apparatus 1 through the operation unit 5. In this regard, the operation unit 5 has the sheet ejection key 55; therefore, the user may have the sheet P ejected by the single action to press the sheet ejection key 55 and may have the blank sheet P easily and promptly.

In the image recording apparatus 1 according to the first embodiment, in S17 and S18 (see FIG. 5) in the sheet ejection job, the CPU 61 may control the conveyer roller 31 so that the conveying speed to convey the sheet P to eject the sheet P may be faster than the conveying speed to convey the sheet P during a print job to record an image thereon. Thus, the image recording apparatus 1 may deliver the blank sheet P to the user according to the user's request more speedily. Further, in S12, the CPU 61 may control the feeding speed of the feeder roller 30 to feed the sheet P to be faster than the feeding speed in a print job so that the sheet P may be ejected even more speedily.

Optionally, the body 3 may have a sheet ejection path 24 (see FIG. 1) formed separately from the path 20. In other words, the body 3 may have the path 20, which may be used to convey the sheet P to record an image in a print job, and the sheet ejection path 24, which may formed at least partly separately from the path 20 and may be used to convey the blank sheet P to be ejected in the sheet ejection job.

For example, as shown in FIG. 1, the sheet ejection path 24 may be formed to extend frontward from a rearward position of the feeder roller 30 to the ejection tray 14. Optionally, a slope (not shown) to extend upper-frontward from a frontward and proximate position from the feeder roller 30 may be arranged such that an upper end of the slope may be pivotably supported by the body 3 while a lower end of the slope may rest on an upper surface of the sheet P in the feeder tray 10 by the effect of gravity. When the sheet ejection job is performed, the CPU 61 may drive the feeder roller 30 to rotate in the normal direction in S12, and when the trailing end of the sheet P approaches substantially close to the feeder roller 30, the CPU 61 may switch the rotating direction of the feeder roller 30 to the reverse direction so that the sheet P may be conveyed to slide upper-frontward on the slope through the sheet ejection path 24 to be ejected at the feeder tray 14.

With the sheet ejection path 24 which is separate from the path 20, the sheet P may be ejected more preferably. For example, as shown in FIG. 1, while the sheet P may be guided in the sheet ejection path 24 without passing through the recording unit 2, the sheet P may be prevented from contacting the recording head 13 or the platen 11, and the blank sheet P may be prevented from being smeared with by the ink. Further, the sheet ejection path 24 may be formed to extend in a shortest distance between the feeder tray 10 and the ejection tray 14 in the body 3 so that the sheet P may be ejected even in shorter time.

Meanwhile, the flow of the processes in the sheet ejection job may not be limited to those described above. For example, in S12, the feeder roller 30 may be driven to rotate at a rotation speed slower than the maximum speed. For another example, in S16-S18, the conveyer roller 31 may be driven to rotate at a speed slower than the maximum speed.

For another example, the recording unit 2 may not necessarily be an inkjet recording unit, in which ink is discharged from the recording head 13 at the sheet P to record an image, but may be, for example, an electro-photographic recording unit, in which toner is adhered to the sheet P to record an image.

Second Embodiment

Next, a second embodiment of the image recording apparatus 100 according to the present disclosure will be described below with reference to FIGS. 6-12. In the following description, parts, items, or steps that are identical to those described in the above embodiment may be referred to by same reference signs or step numbers, and redundant explanation of those may be omitted.

[Image Recording Apparatus]

Figure 6:
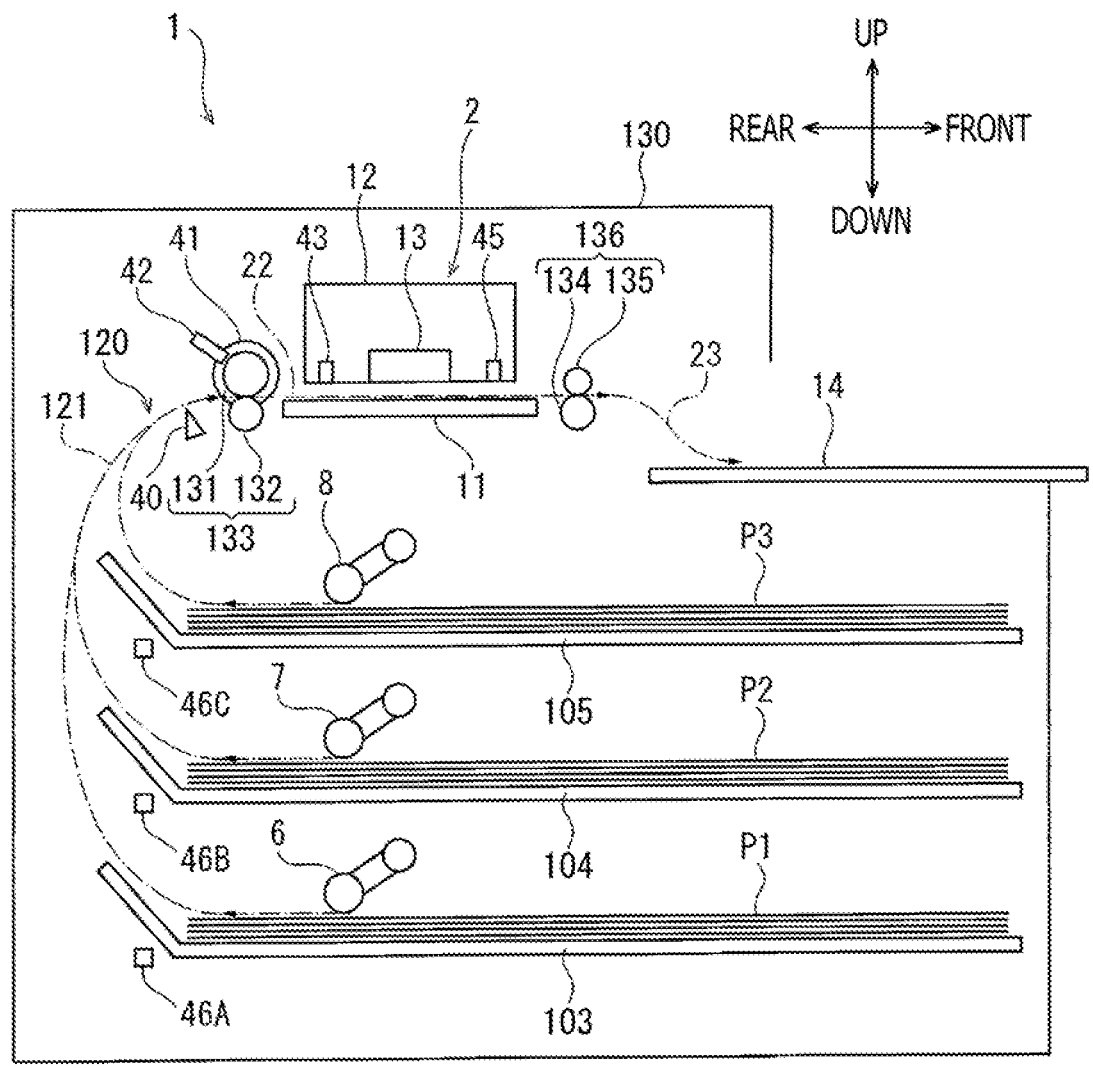
FIG. 6 illustrates an overall configuration of an image recording apparatus according to a second embodiment of the present disclosure.

As shown in FIG. 6, the image recording apparatus 100 in the second embodiment includes a body 130, feeder trays 103, 104, 105 to support a plurality of different types of sheets P1, P2, P3 respectively, the recording unit 2 disposed in an upper position with respect to the feeder trays 103-105 to record images on the sheets P1-P3, and a controller 60 (see FIG. 8) to control each unit in the image recording apparatus 100 including the recording unit 2. The recording unit 2 includes the platen 11 and the carriage 12 with the recording head 13 which are similar to those described in the first embodiment. In a downstream position from the platen 11 with regard to the conveying direction, arranged is the ejection tray 14 to catch the sheets P1-P3, on which images are recorded by the recording unit 2, as the sheets P1-P3 are ejected out of the body 130. The feeder trays 103-105 may or may not be arranged in vertically overlapping positions with in the body 130. For example, one or more of the feeder trays 103-105 may be arranged to protrude outward from the body 130.

In the body 130, formed is a path 120, in which the sheets P1-P3 may be conveyed from the feeder trays 103-105 to the ejection tray 14. The path 120 includes curved paths 121, a straight path 22, and a latter path 23. The curved paths 121 extend from the feeder trays 103-105 to curve upward and frontward and end at a rearward position of the platen 11. The straight path 22 starts from the end of the curved paths 22 to extend linearly above the platen 11 frontward and ends at a frontward position of the platen 11. The latter path 23 starts from the end of the straight path 22 to extend to the ejection tray 14. Therefore, the sheets P1-P3 conveyed in the path 120 travel from the feeder trays 103-105 to the ejection tray 14 through a position between the recording unit 2 and the platen 11.

The image recording apparatus 100 includes feeder rollers 6, 7, 8, a conveyer unit 133 and an ejection unit 136 to convey the sheets P1-P3 along the path 120. The feeder rollers 6-8 are disposed at an upper position with respect to the feeder trays 103-105 respectively and feed the sheets P1-P3 in the feeder trays 103-105 to the path 120. The conveyer unit 133 is arranged in proximity to a downstream end of the curved paths 21 and includes a conveyer roller 131 and a pinch roller 132, which may work similarly to the conveyer roller 33 and the pinch roller 32 described in the first embodiment. The ejection unit 136 is arranged in proximity to a downstream end of the straight path 22 and includes an ejection roller 134 and a spur roller 135, which may work similarly to the ejection roller 34 and the spur roller 35 described in the first embodiment.

The image recording apparatus 100 includes a plurality of types of sensors, including the registration sensor 40, the rotary encoder sensor 42, the medium sensor 43, and the linear encoder sensor 45, which are similar to those described in the first embodiment. Further, the image recording apparatus 100 includes sensors 46A, 46B, 46C, by which a CPU 61 (see FIG. 8) of the controller 60 may detect attached conditions of the feeder trays 103, 104, 105, respectively. In the following description, the sensors 46, 46B, 46C may be referred to as tray-detectable sensors 46. The tray-detectable sensors 46 may include an optical sensor.

Figure 7:
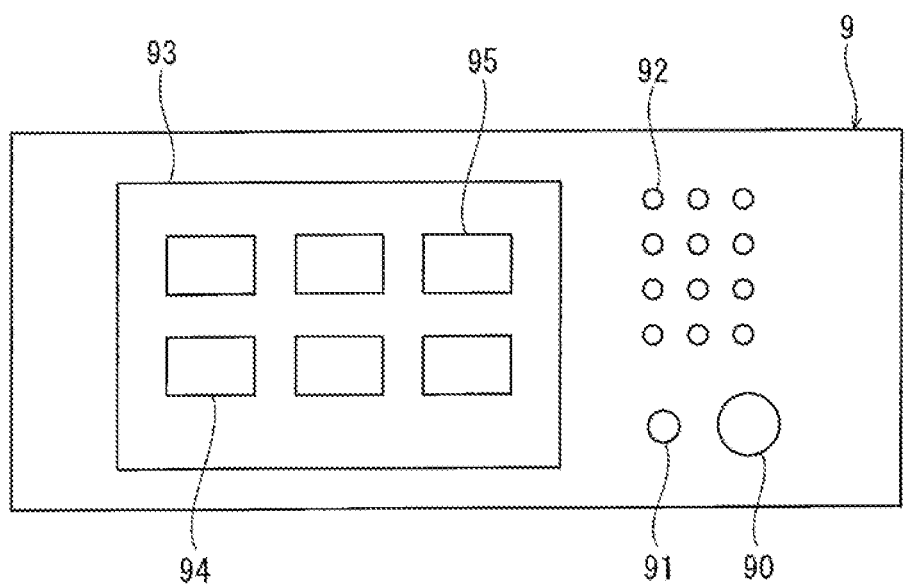
FIG. 7 is an illustrative plan view of an operation unit in the image recording apparatus according to the second embodiment of the present disclosure.

The image recording apparatus 100 includes an operation unit 9 (see FIG. 7). The operation unit 9 is arranged on an upper surface of the body 130 at a position accessible to a user. The operation unit 9 includes a power key 90, a reset key 91, numerical keys 92, and a panel unit 93, which includes a touch-sensitive panel. The panel unit 93 includes a user interface unit, through which the user's requests to the image recording apparatus 100 to execute programs may be entered, and a display unit, through which information regarding the image recording apparatus 100 may be displayed to the user. The panel unit 93 further includes a plurality of keys including a print key 94 and a sheet ejection key 95 in the interface unit. The print key 94 may be pressed by the user to input a request to execute a print job. The sheet ejection key 95 may be pressed by the user to input a request to execute a selected-sheet ejection job (hereinafter, a "sheet ejection job"). The sheet ejection job is a single job to convey one of the sheets P1-P3 stored in the feeder trays 103-105 and eject at the ejection tray 14 independently from the print job, without causing a recording action to record an image on the sheet P1-P3 in the recording unit 2, so that the user may, for example, use the ejected sheet P as a blank sheet to draw or write notes. Thus, the image recording apparatus 100 may perform the sheet ejection job independently to eject the sheet P1-P3 by the user pressing the sheet ejection key 95. The image recording apparatus 100 may include an external input unit (not shown), through which an external job from an external communication device such as a personal computer (PC) may be input in the image recording apparatus 100 through wired or wireless communication.

Figure 8:
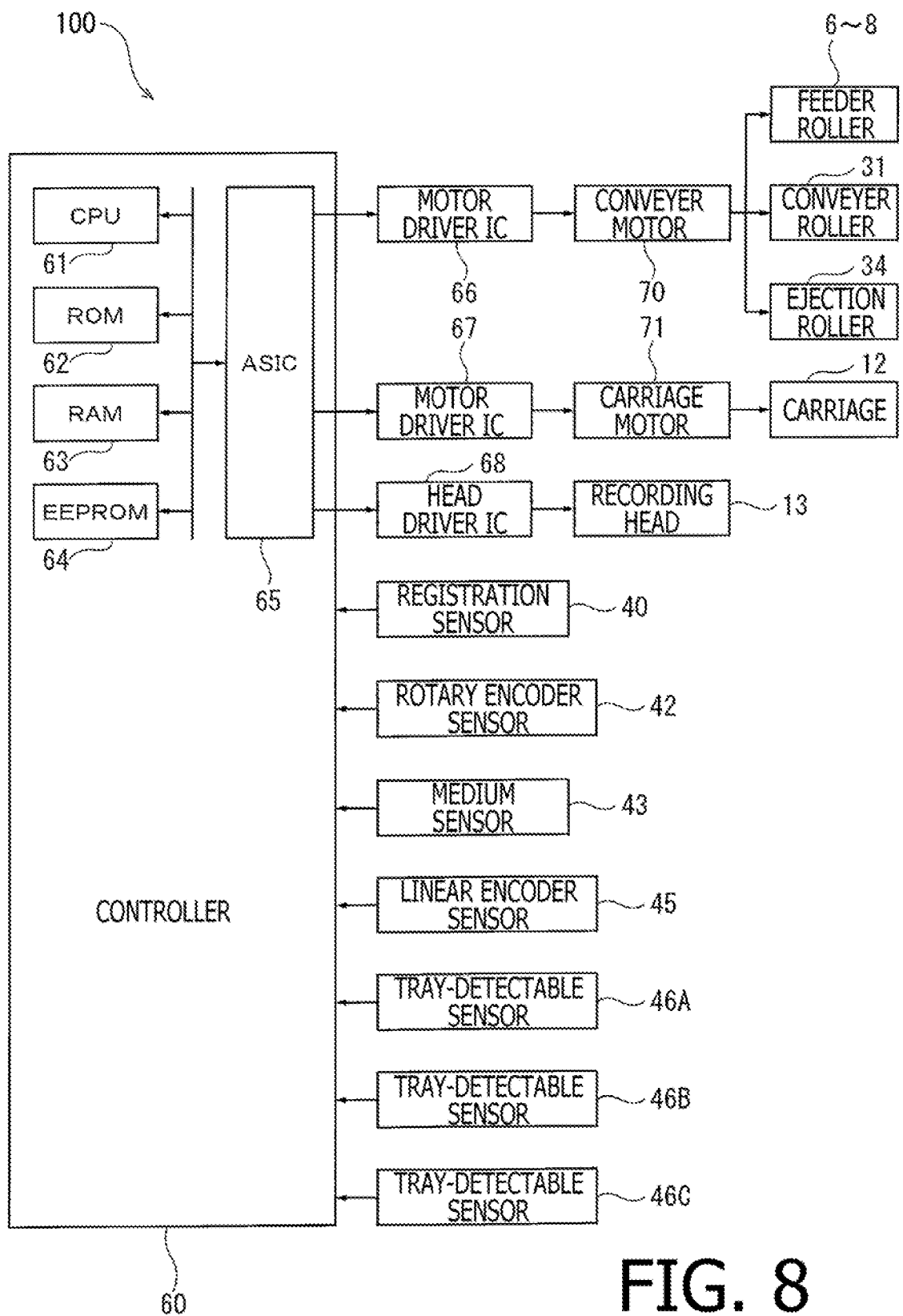
FIG. 8 is a block diagram to illustrate an electrical configuration of the image recording apparatus according to the second embodiment of the present disclosure.

An electric configuration of the image recording apparatus 100 will be described with reference to FIG. 8. The image recording apparatus 100 includes the controller 60, which is similar to the controller 60 described in the first embodiment. The controller 60 includes the CPU 61, the ROM 62, the RAM 63, the EEPROM 64 mounted on the first board, and the ASIC 65 mounted on the second board, which are similar to those described in the first embodiment. The ROM 62 stores a plurality of controlling programs including a print controlling program, which is run in order to implement the print job, and an ejection controlling program, which is run in order to implement the sheet ejection job. The RAM 63 and the EEPROM 64 store sheet-type information for each of the sheets P1, P2, P3 in the feeder trays 103, 104, 105. The sheet-type information may include at least one of print-history information and sheet-setting information. The print-history information includes information regarding a result of a past print job which was performed in the recording unit 2 formerly. The sheet-setting information includes information regarding the feeder trays 103-105 preset by the user. In the present embodiment, the RAM 63 stores the print-history information, and the EEPROM 64 stores the sheet-setting information. The RAM 63 may include a table, in which a size and a type of a sheet having been used in a print job, when the print job is completed correctly as designated by the user, are stored as the print-history information. The type of the sheet may include, for example, regular recording paper, gloss paper, inkjet-printable paper, and OHP sheet. The RAM 63 may further store information regarding a reference sheet size, which may be used in a sheet ejection job. The EEPROM 64 may store, in addition to the sheet-setting information, various types of initial settings and information, which may be input by the user. The ASIC 65 is connected with the motor driver integrated circuits (ICs) 66, 67, and the head driver IC 68, which are similar to those described in the first embodiment.

The CPU 61 may accept the request from the user for the print job through the print key 94 or the external input unit. When the print job is entered, the CPU 61 outputs a command to execute the print job to the ASIC 65 based on the print controlling program stored in the ROM 62. Meanwhile, the CPU 61 may accept the request from the user for the sheet ejection job through the sheet ejection key 95 or the external input unit. When the sheet ejection job is entered, the CPU 61 outputs a command to execute the sheet ejection job to the ASCI 65 based on the ejection controlling program stored in the ROM 62. The ASIC 65 receiving the commands may activate driver programs according to the commands. Thus, the print job and the sheet ejection job may be implemented by the controller 60.

The motor driver IC 66 may activate a conveyer motor 70 to generate driving force and may switch transmission paths for the driving force through known a driving system to transmit the driving force selectively to one or more of the feeder rollers 6-8, the conveyer roller 131, and the ejection roller 134. The image recording apparatus 100 may be equipped with a roller driving mechanism, which includes the CPU 61, the motor driver IC, and the driving system. The roller driving system may apply rotation force of the conveyer motor 70 to the feeder rollers 6-8 and the conveyer roller 131 at variable speeds to drive the feeder rollers 6-8 to rotate in a normal direction while the conveyer roller 131 rotates in a reverse direction, and thereafter drive the conveyer roller 131 to rotate in the normal direction while the transmission path to the feeder rollers 6-8 is switched off.

In this regard, the normal direction of the feeder rollers 6-8 and the conveyer roller 131 is a rotating direction to convey the sheet P downstream along the conveying direction, e.g., from the feeder trays 103-105 to the ejection tray 14, and the reverse direction is a rotating direction opposite from the normal direction. The roller driving system may be replaced with, for example, a plurality of conveyer motors 70, and the motor driver IC 66 may activate each conveyer motor 70 to drive the feeder roller 30, the conveyer roller 131, and the ejection roller 134 separately.

The motor driver IC 67 may activate a carriage motor 71 to move the carriage 12 to reciprocate along the main scanning direction. The head driver IC 68 may drive the recording head 13 and manipulate the recording head 13 to eject ink through the nozzles.

Thus, the behaviors of the feeder rollers 6-8, the conveyer roller 131, and the ejection roller 134 may be conducted by the CPU 61 driving the conveyer motor 70 through the motor driver IC 66. The behavior of the carriage 12 may be conducted by the CPU 61 driving the carriage motor 71 through the motor driver IC. The behavior of the recording head 13 may be conducted by the CPU 61 driving the head driver IC 68.

The controller 60 may receive signals output from the registration sensor 40, the rotary encoder sensor 42, the medium sensor 43, the linear encoder sensor 45, and the tray-detectable sensors 46. Based on the received signals, the CPU 61 may control the driver ICs 66-68 to conduct the print job and the sheet ejection job at predetermined timings.

[Behaviors of the Image Reading Apparatus in the Print Job]

The print job may be started in the image recording apparatus 100 when the CPU 61 accepts and detects the request for the print job from the user and runs the print controlling program read from the ROM 62. When the print job is completed correctly as requested by the user, the CPU 61 may store the sheet-type information, including the size and the type of the sheet used in the print job, in the table in the RAM 63 in association with information identifying the feeder tray 103-105 that supported the sheet.

Figure 9:
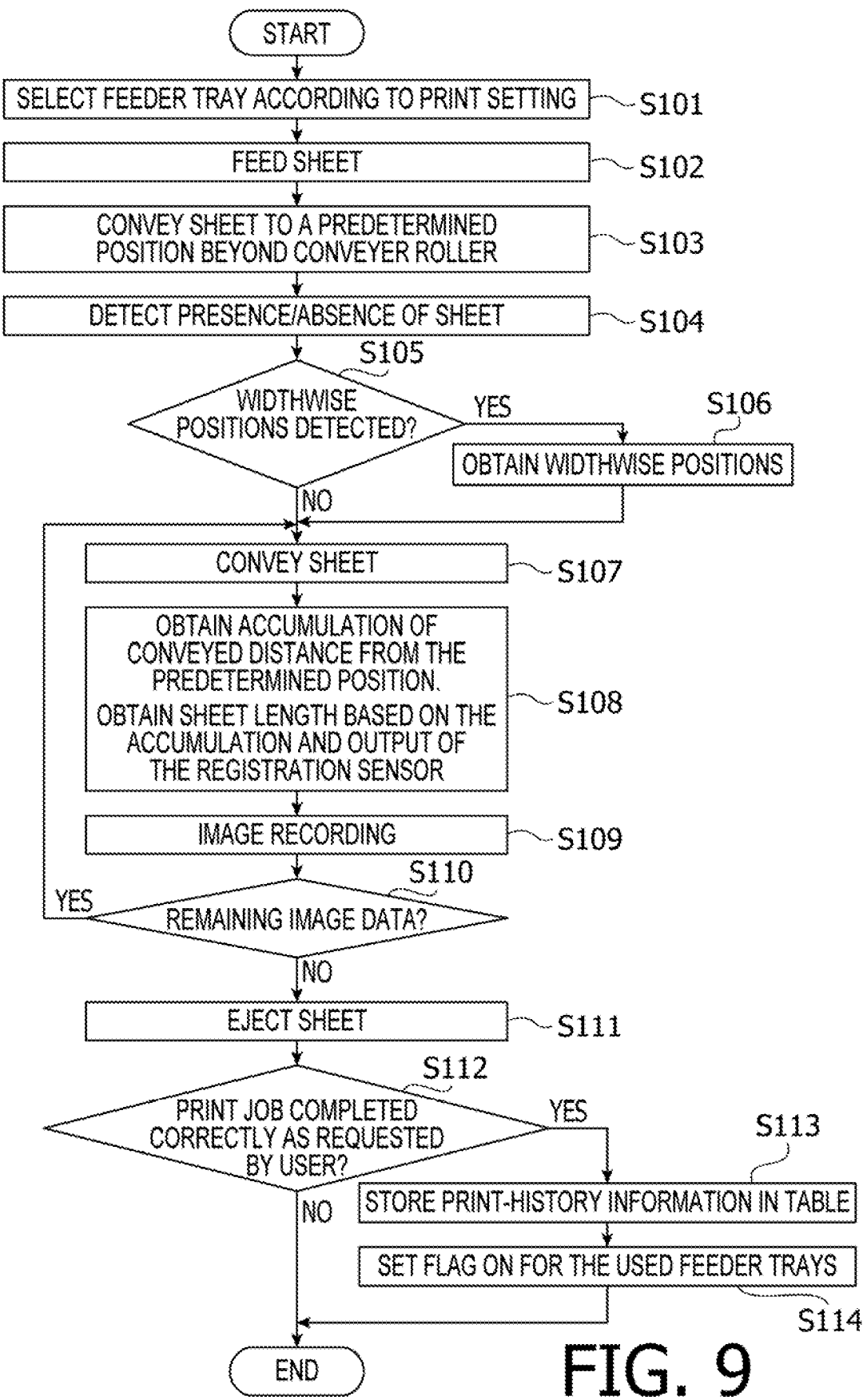
FIG. 9 is a flowchart to illustrate a print job to be executed by a controller of the image recording apparatus according to the second embodiment of the present disclosure.

An overall flow of the behaviors of the image reading apparatus 100 in the print job, in which an image is printed on a sheet P1, will be described with reference to FIG. 9. When the user presses the power key 90, and when the image recording apparatus 100 is powered on, the CPU 61 initializes information stored in the table in the RAM 63. In S101, when the user presses the print key 94, the CPU 61 receives the request for the print job and may select one of the feeder trays 103-105, e.g., the feeder tray 103, according to an initial setting and, in S102, manipulates the feeder roller 6 to rotate in the normal direction based on the print controlling program to feed the sheet P1 from the feeder tray 103 to the path 120.

When the image recording apparatus 100 is connected with a PC though wired or wireless communication, the CPU 61 may manipulate the PC to display a user interface (UI) screen, through which the user of the PC may input an option regarding the print job, and which may be similar to a user interface screen to be displayed through the operation unit 9, on a display unit of the PC. The user of the PC may input the request for the print job by, for example, clicking a print button displayed on the UI screen. The CPU 61 may then receive the request for the print job.

Following S102, when the leading end of the sheet P1 being conveyed in the conveying direction reaches the conveyer roller 131, in S103, the CPU 61 manipulates the conveyer roller 131 to rotate for a predetermined amount so that the leading end of the sheet P1 is located at a predetermined position, with regard to the registration sensor 40, which is substantially downstream from the conveyer roller 131 in the conveying direction. In S104, the CPU 61 detects presence, or absence, of the sheet P1 at the position of the registration sensor 40 in the curved path 120 based on transition of the signals output from the registration sensor 40. In S105, the CPU 61 determines based on transition of the signals output from the medium sensor 43 whether widthwise positions of the sheet P1 are detected. If the widthwise positions of the sheet P1 are determined to be detected (S105: YES), in S106, the CPU 61 obtains width information, which is information regarding a width of the sheet P1 based on the signals output from the medium sensor 43. Thus, when the width information regarding the sheet P1 is available, the CPU 61 may obtain the width information to ensure reliability of the sheet-type information.

If the widthwise positions of the sheet P1 are not detected in S105 (S105: NO), or following S106, in S107, the CPU 61 manipulates the conveyer roller 131 to rotate in the normal direction to convey the sheet P1. In S108, the CPU 61 obtains an accumulated distance for the sheet P1 having been conveyed from the predetermined position located in S103 and until the signals output from the registration sensor 40 indicates OFF. The CPU 61 stores the obtained accumulated distance in the table in the RAM 63 as a sheet length, or a dimension of the sheet P1, along the conveying direction. Thus, through S106 and S108, the CPU 61 may obtain information regarding the size of the sheet P1 during the print job.

In S109, the CPU 61 manipulates the recording head 13 to take the recording action to record an image on the sheet P1. In S110, the CPU 61 determines whether image data for recording another image on the sheet P1 remains. If the image data remains (S110: YES), the CPU 61 repeats S107-S110 with the sheet P1, which may include more than one sheet. While the CPU 61 repeats S107-S110, the CPU 61 obtains the sheet length of the sheet P1 and updates the sheet length in the table in the RAM 63 each time the CPU 61 performs S108. In S110, if the CPU 61 determines that no image data for the sheet P1 remains (S110: NO), in S111, the CPU 61 manipulates the ejection roller 134 in the normal direction to eject the sheet P1 in the ejection tray 14.

In S112, the CPU 61 determines whether the latest print job was completed correctly as designated by the user. In S112, the CPU 1 may determine that the latest job was not completed correctly as designated by the user when, for example, the size or the type of the sheet used to record the image in the latest print job was different from the sheet setting information, when the latest print job was a print job regarding received facsimile data, or when the latest print job was aborted incomplete due to sheet jam that occurred while the sheet was being conveyed.

In S112, if the CPU 61 determines that the latest print job was completed correctly as designated by the user (S112: YES), in S113, the CPU 61 stores the print-history information regarding the feeder tray 103 that supported the sheet P1 used in the latest print job to record the image thereon in the table in the RAM 63. The print-history information may include information regarding the size and the type of the sheet P1 used in the print job; therefore, the CPU 61 stores the print-history information, including the sheet size and the sheet type, in the table in association with the feeder tray 103. In S114, the CPU 61 sets a flag in the table in the RAM 63 that indicates that the print-history information is stored in the table in association with the feeder tray 103. The flow ends thereat. On the other hand, in S112, if the CPU 61 determines that the latest print job was not completed correctly as designated by the user (S112: NO), without changing the information stored in the table in the RAM 63, the CPU 61 ends the flow thereat.

[Behaviors of the Image Reading Apparatus in the Sheet Ejection Job]

Figure 11:
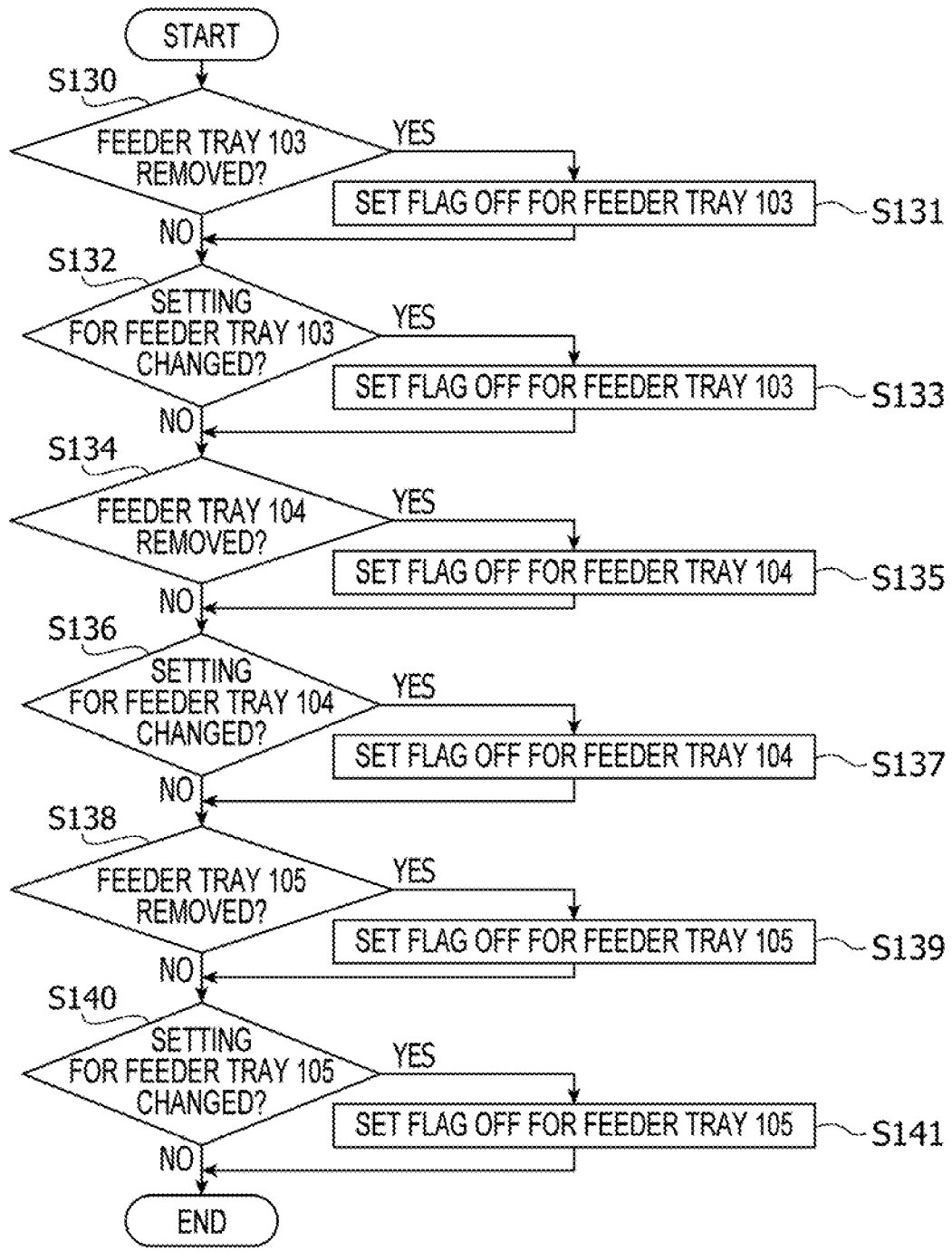
FIG. 11 is a flowchart to illustrate a resetting process to be executed by the controller of the image recording apparatus according to the second embodiment of the present disclosure.
Figure 12:
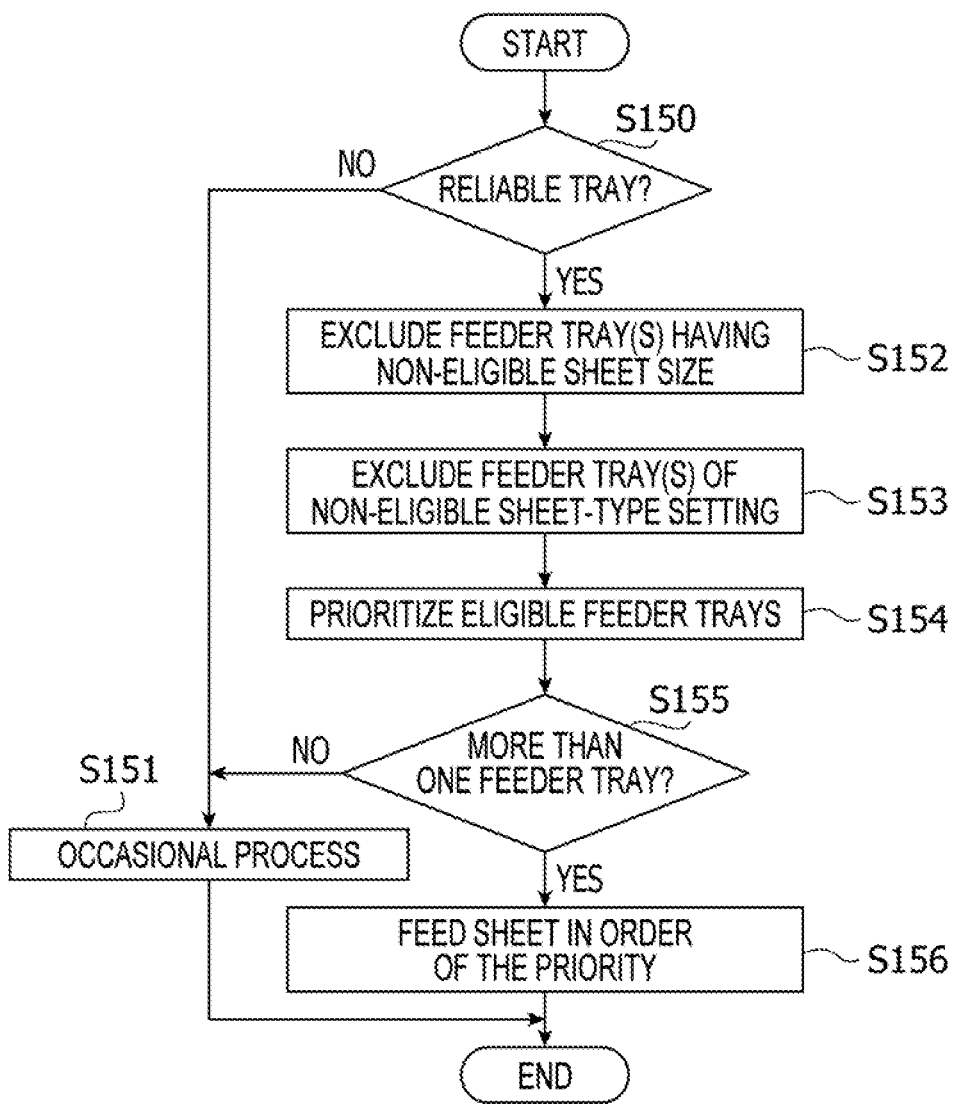
FIG. 12 is a flowchart to illustrate a tray-selecting process to be executed by the controller of the image recording apparatus according to the second embodiment of the present disclosure.

A flow of the behaviors of the image reading apparatus 100 in order to implement the sheet ejection job according to the second embodiment will be described with reference to FIGS. 10-12. When the CPU 61 accepts the request for the sheet ejection job from the user, the CPU 61 executes the sheet ejection job according to a controlling program for sheet ejection stored in the EEPROM 64. According to the flow, the CPU 61 performs a tray selecting process in S122, in which the CPU 61 selects a feeder tray that supports a first-typed sheet among the feeder trays 103-105 based on the sheet-setting information stored in the EEPROM 64 or the print-history information stored in the table in the RAM 63, and a sheet ejecting process in S126, in which the first-typed sheet in the selected feeder tray is conveyed by the conveyer unit 133 and the ejection unit 136 to eject the first-typed sheet without causing a recording action in the recording unit 2, sequentially. According to the second embodiment, the first-typed sheet may be an A4-sized (210 mm*297 mm) regular sheet of paper.

Figure 10:
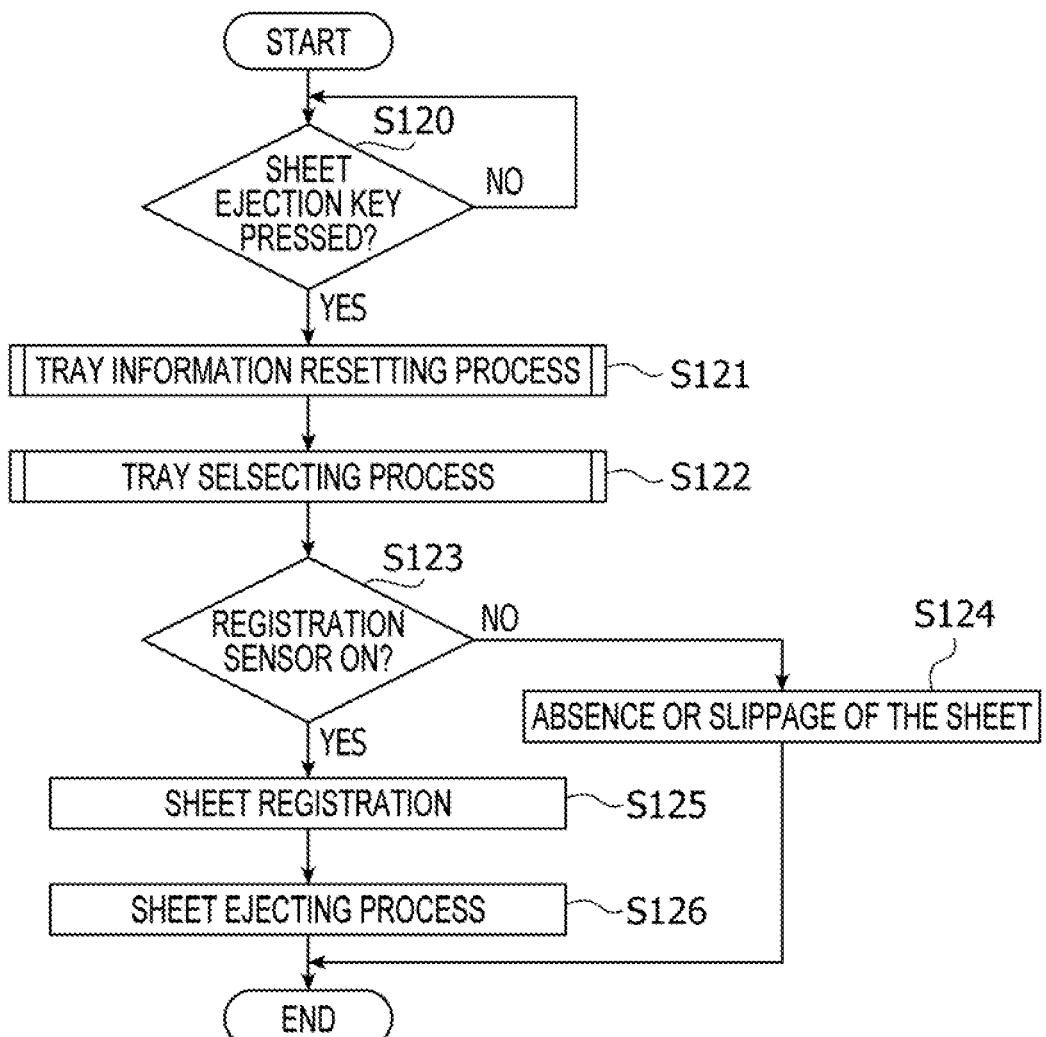
FIG. 10 is a flowchart to illustrate a sheet ejecting process to be executed by the controller of the image recording apparatus according to the second embodiment of the present disclosure.

As shown in FIG. 10, after the image recording apparatus 100 is powered on, in S120, the CPU 61 determines whether the sheet ejection key 95 in the operation unit 9 or the similar button on the UI screen of the external device was pressed by the user. If the CPU 91 determines that the sheet ejection key 95 or the similar button on the UI screen was pressed (S120: YES), in S121, the CPU 61 performs a resetting process to reset tray information stored in the table in the RAM 63, if the print-history information is stored in the table. In particular, in S121, the CPU 61 resets the flag set in the table in the RAM 63 that indicates the presence of the print-history information stored in association with the feeder tray 103 if there is a possibility that the size or the type of the sheet in the feeder tray 103 may have been changed after the flag was set in S114. Optionally, in S120, if the CPU 61 fails to determine that the user pressed the sheet ejection key 95 or the similar button on the UI screen within a predetermined length of period after user's input through the operation unit 9 or the UI screen, the CPU 61 may abort the sheet ejection job.

The resetting process in S121 will be described with reference to FIG. 11. In S130, the CPU 61 monitors the signals from the tray-detectable sensors 46 and determines whether the feeder tray 103 was removed from the body 130 after the completion of the latest print job, which was completed correctly as designated by the user. It may be noted that, even if the latest print job was completed correctly as designated by the user, there may be a case that the feeder tray 103 may have been filled with sheets in a different size or a different type from the sheet P1 used in the latest print job. Therefore, the CPU 61 may determine that the feeder tray 103 may have been filled with sheets indirectly based on a removal experience in the feeder tray 103. In S130, if the CPU 61 determines that the feeder tray 103 experienced removal (S130: YES), in S131, the CPU 61 sets the flag indicating the presence of the print-history information associated with the feeder tray 103 in the table in the RAM 63 OFF. On the other hand, if the CPU 61 determines that the feeder tray 103 has not been removed but stayed attached since the latest print job completed correctly as designated by the user (S130: NO), or following S131, in S132, the CPU 62 determines whether setting information of the feeder tray 103 has been changed by the user. The setting information includes the sheet-setting information and may include information concerning the type of the sheet supported by the feeder tray 103. In S132, if the CPU 61 determines that the setting information concerning the feeder tray 103 has been changed by the user (S132: YES), in S133, the CPU 61 sets the flag indicating the presence of the print-history information associated with the feeder tray 103 in the table in the RAM 63 OFF. In S130, if no print job with the feeder tray 103 has been completed correctly as designated by the user since the power-on of the image recording apparatus 100, the CPU 61 may determine that the feeder tray 103 has not been removed but stayed attached since the latest print job (S130: NO) and proceed to S132.

Thereafter, the CPU 61 performs S134-S137 with regard to the feeder tray 104 and S138-S141 with regard to the feeder tray 105 similarly to S103-S133. Thereafter, the CPU 61 ends the resetting process in S121. The resetting process in S121 may be performed any time after the trailing end of the sheet P passes through the registration sensor 40 and therefore may be performed after S125 or S126 (see FIG. 10), which will be described below.

When the image recording apparatus 100 is powered off, the print-history information stored in the table in the RAM 63 may be deleted. Therefore, if no print-history information is present in the table in the RAM 63 during the resetting process in S121 (see FIG. 10), the CPU 61 may determine either that the image recording apparatus 100 never completed a print job correctly as designated by the user after the poser-on or that the image recording apparatus 100 was powered off after a completion of a print job. If the CPU 61 determines so, the CPU 61 may omit S121 and proceed to S122, which is described below.

Referring back to FIG. 10, in S122, the CPU performs a tray-selecting process, in which the CPU 61, after determining in S112 that the print job with sheet P1 was completed correctly as designated by the user, in S122, determines whether the feeder tray 103 experienced any of removal from the body 130, sheet refill, shutting down the power to the image recording apparatus 100, or change in the sheet-setting information. If the CPU 61 determines that the feeder tray 103 or the image recording apparatus 100 experienced none of the above, the CPU 61 will use the print-history information obtained from the print job that was completed correctly as designated by the user to be the sheet-type information for the feeder tray 103.

The flow of the behaviors of the CPU 61 in the tray-selecting process in S122 will be described with reference to FIG. 12. In S150, the CPU 61 determines whether the table in the RAM 63 stores at least one feeder tray with the flag set on. The feeder tray stored with the flag on in the table in the RAM 63, having history of a print job which was completed correctly as designated by the user, will be referred to as a "reliable feeder tray." The reliable feeder tray will be an option to be selected as the feeder tray to provide the blank sheet in the sheet ejection job. Therefore, in S150, the CPU 61 determines whether the table in the RAM 63 stores any information of a reliable tray. If the CPU 61 determines that the table contains no information of a reliable tray (S150: NO), in S151, the CPU 61 will apply the sheet-setting information, which was preset in advance by the user, as the sheet-type information to each of the feeder trays 103-105 and performs an occasional process. In the occasional process in S151, the CPU 61 ejects a sheet from a predetermined one of the feeder trays 103-105. The predetermined one of the feeder trays 103-015 may be determined based on the sheet-setting information which is preset prior to the tray-selecting process and may be, for example, the feeder tray 103 containing the first-typed (A4-sized) regular paper. For another example, if the image recording apparatus 100 had a feeder tray specifically designated for regular paper, the designated feeder tray may be the predetermined one of the feeder trays to be used in the occasional process in S151. For another example, the CPU 61 may manipulate the panel unit 93 in the operation unit 9 to display a message or a sign to advise the user to select one of the sheet types contained in the feeder trays 103-105, and when the user selects one of the sheet types, the CPU 61 may designate one of the feeder trays 103-105 that should contain the sheet of the selected sheet type to be the predetermined one of the feeder trays 103-105.

Meanwhile, behaviors of the CPU 61 in the occasional process may not necessarily be limited to those described above. For example, if the sheet-setting information for the feeder trays 103-105 indicates that none of the feeder trays 103-105 contains the first-typed A4-sized regular paper, the CPU 61 may display a message or a sign on the panel unit 93 in the operation unit 9 to advise the user that no suitable sheet is available and omit S122-S126. The flow may be ended thereat.

In S150, meanwhile, if the CPU 61 determines that the table contains information of at least one reliable tray (S150: YES), in S152, the CPU 61 excludes a feeder tray for a non-eligible sheet size from the option to be selected as the feeder tray to provide the blank sheet. The non-eligible sheet size refers to a sheet size, which may not be suitable to be provided to the user as the blank sheet, and may include, for example, but not limited to, a postcard size, an L-size (89 mm*127 mm), B5-size (182 mm*257 mm), and an envelope-size. For another example, the non-eligible sheet size may be set by the user's preference. Following S152, in S153, the CPU 61 excludes a feeder tray designated for a non-eligible sheet type from the remainder option in S152. The non-eligible sheet type may be, for example, but not limited to, gloss paper, inkjet-suitable paper, cardboard, and an OHP (overhead projector) sheet. For another example, a condition of the non-eligible sheet type may be set by the user's preference. Optionally, S152 and S153 may be incorporated in one step.

In S154, the CPU 61 compares sizes of the sheets supported on the feeder trays remaining as the options after S150-S153 with the reference size information stored in the RAM 63 and sets priorities on the options so that a feeder tray associated with a sheet size closer to the reference size should have a higher priority and a feeder tray associated with a sheet size farther from the reference size should have a lower priority. The reference size may be, for example, but not limited to, the A4 size, or may be set by the user's preference. For another example, the CPU 61 may set the priorities on the options of the feeder trays so that a feeder tray which is closer to the ejection tray 14 through the path 120 should have a higher priority and a feeder tray which is farther from the ejection tray 14 through the path 120 should have a lower priority.

In S155, the CPU 61 determines whether the remainder of the feeder trays prioritized in S154 includes at least one feeder tray. If the CPU 61 determines that no feeder tray to be prioritized remains after S154 (S155: NO), the CPU 61 proceeds to the occasional process in S151. If the CPU 61 determines that at least one feeder tray remains in S154 to be prioritized (S155: YES), in S156, the CPU 61 feeds the sheet from the feeder tray having the highest prioritized to the path 120. The flow ends thereat, and the CPU 61 proceeds to S123 in FIG. 10.

Thus, in the tray-selecting process in S122, if the feeder tray has the history of a print job that was completed correctly as designated by the user, the print-history information may be used as the sheet-type information. Meanwhile, if the feeder tray does not have history of a print job that was completed correctly as designated by the user, or if the feeder tray experienced removal from the body 130 and therefore may contain sheets of a type, which is different from the type in the print-history, the sheet-setting information may be used as the sheet-type information. Thereby, the types of the sheets supported on the feeder trays 103-105 may be correctly determined.

Referring back to FIG. 10, in S123, the CPU 61 determines whether a signal output from the registration sensor 40 indicates ON. The determination in S123 may be made, for example, throughout a predetermined length of period which starts at the start of feeding the sheet in S156 (see FIG. 12), or, if a sheet is fed in the occasional process in S151 (see FIG. 12), at start of feeding the sheet. If the signal output from the registration sensor 40 does not indicate ON (S123: NO), in S124, the CPU 61 determines that the feeder tray contains no sheet or that the sheet is slipping in the feeder tray or in the curved path 121 and cannot reach the registration sensor 40. The CPU 61 ends the sheet ejecting process thereat. Optionally, following S124, the CPU 61 may control the display unit 93 to display a message to inform the user of the absence of the sheet in the feeder tray or the slippage of the sheet before ending the sheet ejecting process.

In S123, if the CPU 61 determines that the signal output from the registration sensor 40 indicates ON (S123: YES), in S125, the CPU 61 corrects orientation of the sheet with respect to the conveying direction, by driving the conveyer roller 131 to rotate in the reverse direction while the feeder roller 6 is driven to rotate in the normal direction for a predetermined amount. In S126, the CPU 61 drives the conveyer roller 131 and the ejection roller 134 to rotate in the normal direction at a maximum speed to eject the sheet at the ejection tray 14. The CPU 61 ends the flow thereat. The maximum speed of the conveyer roller 131 and the ejection roller 134 in S125 and S126 may be a fastest rotatable speed for the conveyer roller 131 and the ejection roller 134 within a mechanically rotatable speed range.

As described above, in the image recording apparatus 100 according to the second embodiment, the CPU 61 receiving the request for the sheet ejection job may select a feeder tray that supports the first-typed sheet based on the sheet-type information and manipulate the conveyer unit 133 to convey the first-typed sheet supported on the selected feeder tray so that the first-typed sheet may be ejected at the ejection tray 14 without causing the recording action in the recording unit 2. Therefore, the user may be provided with the blank sheet promptly without taking weary actions to find the feeder tray that contains the sheet of the desired size or type manually.

According to the image recording apparatus 100, further, the sheet-type information includes at least one of the print-history information and the sheet-setting information; therefore, the CPU 61 may determine the types of the sheets P1-P3 supported on the feeder trays 103-105 more correctly based at least on the print-history information or the sheet-setting information.

According to the image recording apparatus 100, further, in the tray-selecting process in S122 (see FIG. 10), if both the sheet-setting information and the print-history information regarding the feeder tray 103, 104, or 105 are stored in the RAM 63, in S156 (see FIG. 12), the CPU 61 may determine the sheet-type of the sheet in the feeder tray based on the print-history information. In this regard, by relying on the print-history information, rather than the sheet-setting information which may be input incorrectly by the user, the CPU 61 may select the sheet to be provided to the user correctly.

According to the image recording apparatus 100, further, the CPU 61 may obtain size information regarding a dimension of the sheet along the conveying direction and/or the direction orthogonal to the conveying direction during a print job in S106, S108 (see FIG. 9), and when the print job is completed correctly as designated by the user, the print-history information including the size information is used later in order to determine the type of the sheet to be provided to the user correctly.

According to the image recording apparatus 100, further, information regarding the reference size for the sheets P1-P3 is stored in the RAM 63. Therefore, when two (2) or more feeder trays among the feeder trays 103-105 contain the regular paper, in the tray-selecting process in S122 (FIG. 10), the CPU 61 may select the feeder tray that may contain the regular paper having a size which is the closest to the reference size in S156 (FIG. 12). Thus, by having the reference size set in advance to suit the user's preference, the regular paper, which may be suitable for the blank note sheets, may be provided to the user.

According to the image recording apparatus 100, further, the sheet may be conveyed through the path 120, which is also a path for the sheet to have an image recorded thereon by the recording unit 2, to be ejected at the ejection tray 14 in the sheet ejection process in S126 (FIG. 10). Therefore, compared to a configuration, in which a path for sheet ejection is formed separately from the path for image recording, the configuration of the image recording apparatus 100 may be less complicated and downsized.

Although examples of carrying out the disclosure have been described, those skilled in the art will appreciate that there are numerous variations and permutations of the image recording apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the recording unit 2 may not necessarily be an inkjet recording unit, in which ink is discharged from the recording head 13 at the sheet P1-P3 to record an image, but may be, for example, an electro-photographic recording unit, in which toner is adhered to the sheet P1-P3 to record an image.

For another example, correction of the orientation of the sheet P1-P3 with respect to the conveying direction in S125 (FIG. 10) may be omitted. For another example, the feeder trays 103-105 may not necessarily be detachable from the body 130 independently but may be formed integrally so that the feeder trays 103-105 may be removed from or attached to the body 130 collectively.

For another example, the first-typed sheet, which is the sheet to be ejected in the second embodiment, may not necessarily be in the A4 size or the regular paper but may be, for example, in A3 size (297 mm*420 mm), B4 size (257 mm*354 mm), or a letter size, or may be other type than the regular paper.

The embodiments described above may be applied to an image recording apparatus which may include, for example, but may not be necessarily limited to, an inkjet printer, an electro-photographic printer, and a thermal-ribbon transferable facsimile or printer.

What is claimed is:

1. An image recording apparatus, comprising:
   a body comprising a path, along which a sheet is conveyed from a feeder tray to an ejection tray;
   a conveyer configured to convey the sheet along the path;
   an image recorder configured to record an image on the sheet being conveyed according to a print job; and
   a controller configured to control the conveyer and the image recorder,
   wherein the controller is configured to execute:
      accepting a request for executing a sheet ejection job, the sheet ejection job including ejection of the sheet from the feeder tray to the ejection tray without causing a recording action to record an image on the sheet in the image recorder; and
      executing the sheet ejection job, the controller controls the conveyer to convey the sheet from the feeder tray to the ejection tray without causing the recording action in the image recorder,
   wherein a length of time from acceptance of the request for executing the sheet ejection job to completion of the sheet ejecting job without causing the recording action is shorter than a length of time from input of the print job through the recording action to completion of ejection of the sheet,
   wherein the path comprises a printer path for the sheet to be conveyed therein during the print job and a sheet-ejection path for the sheet to be conveyed therein during the sheet ejection job, and wherein the printer path and the sheet-ejection path extend from the feeder tray to the ejection tray, and
   wherein the sheet-ejection path is shorter than the printer path and wherein the sheet-ejection path extends in a shortest distance in the body between the feeder and the ejection tray.

2. The image recording apparatus according to claim 1, wherein the body comprises an input device, through which an operation from a user to input the request for executing the sheet ejection job to the controller is accepted.

3. The image recording apparatus according to claim 2, wherein the input device is configured to accept the request for executing the sheet ejection job to the controller in a single action by the user.

4. The image recording apparatus according to claim 1, wherein the controller controls the conveyer to convey the sheet during the sheet ejecting job at a faster conveying speed than a conveying speed to convey the sheet during the print job.

5. The image recording apparatus according to claim 1, further comprising:
   a feeder configured to feed the sheet from the feeder tray to the conveyer,
   wherein the controller is configured to control the feeder to feed the sheet during the sheet ejection job at a faster feeder conveying speed than a feeder conveying speed to convey the sheet during a print job, in which the image is recorded on the sheet by the image recorder.

6. The image recording apparatus according to claim 1, wherein the printer path and the sheet-ejection path are at least partially separated from each other.

7. An image recording apparatus, comprising:
a body comprising a path, along which a sheet is conveyed from a feeder tray to an ejection tray;
a conveyer configured to convey the sheet along the path;
an image recorder configured to record an image on the sheet being conveyed according to a print job; and
a controller configured to control of the conveyer and the image recorder,
wherein the body comprises an input device, through which an operation from a user to input a request for executing a sheet ejection job to the controller is accepted, the sheet ejection job including ejection of the sheet from the feeder tray to the ejection tray without causing a recording action to record an image on the sheet in the image recorder,
wherein the controller is configured to execute a sheet ejection process in which, after the input device accepts the request for executing the sheet ejection job, the controller controls the conveyer to convey the sheet from the feeder tray to the ejection tray without causing the recording action in the image recorder, and
wherein a length of time from acceptance of the request for executing the sheet ejection job to completion of the sheet ejecting process without causing the recording action is shorter than a length of time from input of the print job through the recording action to completion of ejection of the sheet,
wherein the path comprises a printer path for the sheet to be conveyed therein during the print job and a sheet-ejection path for the sheet to be conveyed therein during the sheet ejection job, and wherein the printer path and the sheet-ejection path extend from the feeder tray to the ejection tray, and
wherein the sheet-ejection path is shorter than the printer path and wherein the sheet-ejection path extends in a shortest distance in the body between the feeder and the ejection tray.

8. An image recording apparatus, comprising:
a body comprising a path, along which a sheet is conveyed from a feeder tray to an ejection tray;
a conveyer configured to convey the sheet along the path;
an image recorder configured to record an image on the sheet being conveyed according to a print job;
a sheet-supporting member arranged to face the image recorder; and
a controller configured to control the conveyer and the image recorder,
wherein the controller is configured to execute:
accepting a request for executing a sheet ejection job, the sheet ejection job including ejection of the sheet from the feeder tray to the ejection tray without causing a recording action to record an image on the sheet in the image recorder; and
executing the sheet ejection job, the controller controls the conveyer to convey the sheet from the feeder tray to the ejection tray without causing the recording action in the image recorder,
wherein a length of time from acceptance of the request for executing the sheet ejection job to completion of the sheet ejecting job without causing the recording action is shorter than a length of time from input of the print job through the recording action to completion of ejection of the sheet,
wherein the path comprises a printer path for the sheet to be conveyed therein during the print job and a sheet-ejection path for the sheet to be conveyed therein during the sheet ejection job, and wherein the printer path and the sheet-ejection path extend from the feeder tray to the ejection tray, and
wherein the sheet-ejection path extends to the ejection tray without extending through an intervening position between the sheet-supporting member and the image recorder.

9. The image recording apparatus according to claim 8, wherein the body comprises an input device, through which an operation from a user to input the request for executing the sheet ejection job to the controller is accepted.

10. The image recording apparatus according to claim 9, wherein the input device is configured to accept the request for executing the sheet ejection job to the controller in a single action by the user.

11. The image recording apparatus according to claim 8, wherein the controller controls the conveyer to convey the sheet during the sheet ejecting job at a faster conveying speed than a conveying speed to convey the sheet during the print job.

12. The image recording apparatus according to claim 8, further comprising:
a feeder configured to feed the sheet from the feeder tray to the conveyer,
wherein the controller is configured to control the feeder to feed the sheet during the sheet ejection job at a faster feeder conveying speed than a feeder conveying speed to convey the sheet during a print job, in which the image is recorded on the sheet by the recording unit.

13. The image recording apparatus according to claim 8, wherein the printer path and the sheet-ejection path are at least partially separated from each other.

14. An image recording apparatus, comprising:
a body comprising a path, along which a sheet is conveyed from a feeder tray to an ejection tray;
a conveyer unit configured to convey the sheet along the path;
an image recorder configured to record an image on the sheet being conveyed according to a print job;
a sheet-supporting member arranged to face the image recorder; and
a controller configured to control of the conveyer unit and the image recorder,
wherein the body comprises an input device, through which an operation from a user to input a request for executing a sheet ejection job to the controller is accepted, the sheet ejection job including ejection of the sheet from the feeder tray to the ejection tray without causing a recording action to record an image on the sheet in the image recorder,
wherein the controller is configured to execute a sheet ejection process in which, after the input device accepts the request for executing the sheet ejection job, the controller controls the conveyer to convey the sheet from the feeder tray to the ejection tray without causing the recording action in the image recorder,
wherein a length of time from acceptance of the request for executing the sheet ejection job to completion of the sheet ejecting process without causing the recording action is shorter than a length of time from input of the print job through the recording action to completion of ejection of the sheet, wherein the path comprises a printer path for the sheet to be conveyed therein during the print job and a sheet-ejection path for the sheet to be conveyed therein during the sheet ejection job, and wherein the printer path and the sheet-ejection path extend from the feeder tray to the ejection tray, and wherein the sheet-ejection path extends to the ejection tray without extending through an intervening position between the sheet-supporting member and the image recorder.

\* \* \* \* \*